US012557808B2

(12) United States Patent
Fan et al.

(10) Patent No.: US 12,557,808 B2
(45) Date of Patent: Feb. 24, 2026

(54) VIVO ORGAN TRANSFER DEVICE

(71) Applicant: Ning Fan, Qingdao (CN)

(72) Inventors: Ning Fan, Qingdao (CN); Jinzhen Cai, Qingdao (CN); Yuan Guo, Qingdao (CN); Xiaodan Zhu, Qingdao (CN); Zengqiang Dai, Qingdao (CN); Yanrong Zhao, Qingdao (CN); Dong Wang, Qingdao (CN); Chao Yang, Qingdao (CN)

(73) Assignee: Ning Fan, Qingdao (CN)

( * ) Notice: Subject to any disclaimer, the term of this patent is extended or adjusted under 35 U.S.C. 154(b) by 735 days.

(21) Appl. No.: 17/809,549

(22) Filed: Jun. 28, 2022

(65) Prior Publication Data

US 2023/0240286 A1     Aug. 3, 2023

(30) Foreign Application Priority Data

Jan. 28, 2022     (CN) .......................... 202210101815.3

(51) Int. Cl.
*A01N 1/148* (2025.01)
(52) U.S. Cl.
CPC .................................... *A01N 1/148* (2025.01)
(58) Field of Classification Search
None
See application file for complete search history.

(56) References Cited

U.S. PATENT DOCUMENTS

2005/0043750 A1* 2/2005 Scott, III ............. A61B 17/221
606/151

FOREIGN PATENT DOCUMENTS

CN     107303198     10/2017
CN     215381041     1/2022
CN     215381041 U  * 1/2022

OTHER PUBLICATIONS

Office Action in CN App No. 2022101018153 dated Dec. 20, 2022.

* cited by examiner

*Primary Examiner* — William H. Beisner
(74) *Attorney, Agent, or Firm* — Au Law Office, P.C.; Yiu F. Au

(57)     ABSTRACT

The invention discloses an in vivo organ transfer device, which comprises an organ fixing bag and an organ bag push assembly, wherein the organ fixing bag is composed of an inner bag and an outer bag, the outer bag is provided with an ice water filling hole and a link rod fixing interfaces, multiple groups of link rod fixing interfaces are arranged on both sides of the outer bag, and the inner layer bag is provided with an organ inlet, an input conduit opening and an output conduit opening. The invention belongs to the technical field of in vivo organ transfer, in particular relates to an in vivo organ transfer device that can provide good temperature conditions in the organ implantation process and it can fix the transplant in the reconstruction process to make the transplant in the optimum location and angle most conducive to the conduit suturing, creating favorable conditions for minimally invasive organ transplantation.

2 Claims, 1 Drawing Sheet

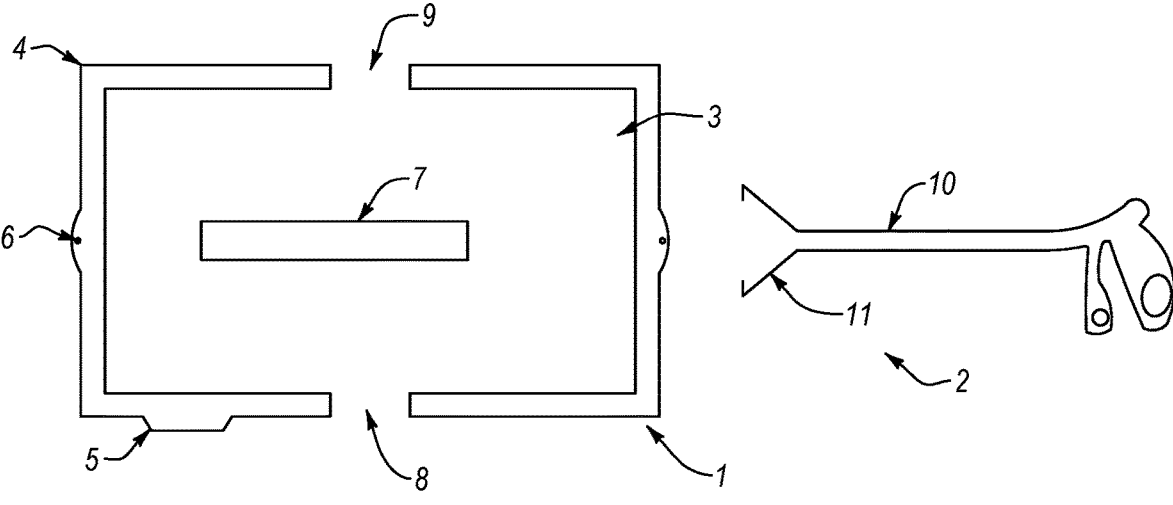

VIVO ORGAN TRANSFER DEVICE

RELATED APPLICATIONS

This application claims priority to China Patent Application No. 202210101815.3, filed Jan. 27, 2022; the above-identified application is hereby incorporated by reference herein.

TECHNICAL FIELD

The invention belongs to the technical field of in vivo organ transfer, in particular relates to an in vivo organ transfer device.

BACKGROUND ART

In the minimally invasive organ transplantation surgery, it is necessary to push the organ to the site for transplantation from the subabdominal transverse incision. At present, there is no special push device to transfer the organ to the site for transplantation, and there is also no organ transfer device. It is necessary to keep low temperature throughout the whole process during the organ implantation process. The body is at 37 degrees Celsius in a minimally invasive environment. The push device needs to carry ice water and remove the ice water after the blood flow is reconstructed and the organ is rewarmed. The implant should be fixed in the optimum location and angle conducive to the conduit suturing during the reconstruction process. These are technical problems to be solved in minimally invasive organ transplantation surgery. Therefore, the invention provides an in vivo organ transfer device that gives good temperature conditions in the organ implantation process. Also, it can fix the transplant in the reconstruction process to make the transplant in the optimum location and angle most conducive to the conduit suturing, creating favorable conditions for minimally invasive organ transplantation.

SUMMARY OF THE INVENTION

To solve the above problems, the invention provides an in vivo organ transfer device which can provide good temperature conditions in the organ implantation process and can fix the transplant in the reconstruction process to make the transplant in the optimum location and angle most conducive to the conduit suturing, creating favorable conditions for minimally invasive organ transplantation.

To achieve the above functions, the invention adopts the following technical proposal: An in vivo organ transfer device comprises an organ fixing bag and an organ bag push assembly, wherein the organ fixing bag is composed of an inner bag and an outer bag. The inner bag is used to accommodate the organ. The outer bag is used to contain flake ice and is provided with an ice water filling hole and a link rod fixing interfaces. The caliber of the ice water filling hole is equal to that of the minimally invasive suction apparatus, which can be connected with the interface to facilitate the filling or suction of ice or hot water and achieve the function of cooling or rewarming around the organ. An automatic shutoff valve is arranged outside the ice water filling hole to facilitate the automatic shutoff. Multiple groups of link rod fixing interfaces are placed on both sides of the outer bag, and 2-3 link rod fixing interfaces are arranged on the outer bag according to the organ's size. Also, the third link rod fixing interfaces can be added to the foot side for the large organ to move and fix the organ. The inner layer bag is provided with an organ inlet, an input conduit opening, and an output conduit opening. The organ inlet is provided with different calibers (10-15 cm) according to the size of the organ. A seal is arranged at the opening for sealing after the organ is put into the inner bag. The organ orifice is facing the input conduit opening. The output conduit opens after the organ is put into the inner bag. The conduits of the organ can be extended out of the bag from the input conduit opening and the output conduit opening to facilitate the exposure, repair, and suturing reconstruction of the conduits.

Preferably, the organ bag push assembly comprises fixing rods and bayonets. The bayonet is arranged at the end of the fixing rod. The fixing rods are connected with the link rod fixing interfaces on the outer bag through the bayonets.

Preferably, the fixing rod is the same as the in vitro part of the ordinary minimally invasive grasper.

As a preferred technical proposal of the invention, the bayonet fits with the link rod fixing interfaces to facilitate the connection of the organ fixing bag with the organ bag push assembly.

The invention has the following beneficial effects by adopting the above structure: An in vivo organ transfer device provided by the invention is provided with the organ fixing bag. The inner bag is used to accommodate the organ. The outer bag is used to contain flake ice. The ice water filling hole facilitates the filling or suction of ice water or hot water to achieve the function of cooling or rewarming around the organ. The link rod fixing interfaces make the organ movable and fixable easily. The organ inlet facilitates sealing after the organ is put into the inner bag. The organ orifice faces the input conduit opening and the output conduit opening after the organ is put into the inner bag. Also, the conduits of the organ can be extended out of the bag from the input conduit opening and the output conduit opening to facilitate the exposure, repair, and suturing reconstruction of the conduits. The in vivo organ transfer device can provide good temperature conditions in the organ implantation process and can fix the transplant in the reconstruction process to make the transplant in the optimum location, and angle most conducive to the conduit suturing, creating favorable conditions for minimally invasive organ transplantation; the in vivo organ transfer device is provided with the organ bag push assembly, and the fixing rods are connected with the link rod fixing interfaces on the outer bag through the bayonets to push the organ bag.

DESCRIPTION OF DRAWING

FIG. 1 is the schematic diagram for the overall structure of an in vivo organ transfer device proposed in the invention.

Wherein, 1. Organ fixing bag, 2. Organ bag push assembly, 3. Inner bag, 4. Outer bag, 5. Ice water filling hole, 6. Link rod fixing interface, 7. Organ inlet, 8. Input conduit opening, 9. Output conduit opening, 10. Fixing rod, 11. Bayonet.

EMBODIMENTS

The technical proposal for the invention is clearly and completely described below in combination with the drawings. Obviously, the described embodiments are only part of the embodiments of the invention, but not all embodiments. Based on the embodiments of the invention, all other embodiments obtained by ordinary technicians in the field without creative labor are within the scope of protection of the invention.

In the description of the invention, it should be noted that the orientation or position relations are indicated by the terms such as "center" and "upper" and "lower," "left" and "right," "vertical" and "horizontal," "inner" and "outer" are based on the orientation or position relations shown in the drawings for the convenience of describing the invention and simplifying the description, but do not indicate or imply that the device or component must be constructed and operated in a particular orientation, so they shall not be construed as a limitation on the invention. In addition, the terms "first", "second," and "third" are used for descriptive purposes only and are not construed to indicate or imply a relative importance. The invention is further described in detail in combination with the drawings.

As shown in FIG. 1-2, an in vivo organ transfer device provided by the invention comprises an organ fixing bag 1 and an organ bag push assembly 2, the organ fixing bag 1 is composed of an inner bag 3 and an outer bag 4, the outer bag 4 is provided with an ice water filling hole 5 and link rod fixing interfaces 6, multiple groups of link rod fixing interfaces 6 are arranged on both sides of the outer bag 4, the inner layer bag 3 is provided with an organ inlet 7, an input conduit opening 8 and an output conduit opening 9, the organ bag push assembly 2 comprises fixing rods 10 and bayonets 11, the fixing rod 10 is the same as the in vitro part of the ordinary minimally invasive grasper, and the bayonet 11 is arranged at the end of the fixing rod 10 and fits with the link rod fixing interfaces 6.

For specific use, the organ is put into the inner bag 3 through the organ inlet 7 outside the body, the inflow tube is led through the input conduit opening 8, the outflow tube is led through the output conduit opening 9, the fixing rods 10 are connected to the left and right sides of the organ fixing bag 1 through the link rod fixing interfaces 6 and the bayonet 11 after vacuuming between the inner bag 3 and the outer bag 4 through the ice water filling hole 5, the organ is delivered into the body from the incision, the organ fixing bag 1 is delivered to the predetermined position through the left and right fixing rods 10, fine-adjusted, and then fixed so that the organ conduits led from the input conduit opening 8 and the output conduit opening 9 keep the optimal anastomosis distance and angle with the conduits butted inside the body, ice water is quickly filled between the inner bag 3 and the outer bag 4 through the valve at the ice water, filling hole 5 to cover the organ, the built-in thermometer displays the real-time temperature between the inner bag 3 and the outer bag 4, and the ice water around the organ is kept at 0 to 4 degrees Celsius. During vascular remodeling, it can be changed constantly through the valve at the ice water filling hole 5.

After vascular remodeling and before restoration of perfused blood flow, the ice water is quickly changed to hot water to open the anastomotic stoma and rewarm the liver, the organ fixing bag 1 can be sheared inside the body to release the organ after stable circulation, all bleeding during release is anastomotic bleeding, the organ position can be adjusted through the fixing rods 10 on two sides to reveal the bleeding points for suture hemostasis, the organ is released when the anastomotic stoma does not bleed, and then the small area of blood oozing is examined on the organ surface, thus achieving the effect of step-by-step hemostasis and improving the hemostasis precision and efficiency in the minimally invasive surgery.

The invention and its embodiments are described above. The description is not restricted, the drawings only show one of the embodiments of the invention, but the actual structure is not so limited. In a word, if the ordinary technicians in the field are inspired by the invention, design structures, and embodiments similar to the technical proposal without deviation from the purpose of the invention and without creativity, such structures and embodiments shall be within the scope of protection of the invention.

The invention claimed is:

1. An in vivo organ transfer device for liver transfer, comprising an organ fixing bag and an organ bag push assembly, wherein the organ fixing bag is composed of an inner bag and an outer bag, wherein the outer bag is provided with an ice water filling hole, and a link rod fixing interfaces, wherein multiple groups of link rod fixing interfaces are arranged on both sides of the outer bag, wherein the inner layer bag is provided with an organ inlet, an input conduit opening, and an output conduit opening, wherein the organ bag push assembly comprises a fixing rod and a bayonet, wherein the bayonet is arranged at the end of the fixing rod, wherein the bayonet is fit with the link rod fixing interfaces, wherein a caliber of the organ inlet is 10-15 cm, wherein a seal is arranged at the input conduit opening, and wherein the organ fixing bag includes a shearing position.

2. The in vivo organ transfer device according to claim 1, wherein the fixing rod is an in vitro part of an ordinary minimally invasive grasper.

* * * * *